(12) United States Patent
Claireaux et al.

(10) Patent No.: US 11,214,508 B2
(45) Date of Patent: Jan. 4, 2022

(54) CHEMICALLY STRENGTHENED COLORED THIN GLASS

(71) Applicant: SAINT-GOBAIN GLASS FRANCE, Courbevoie (FR)

(72) Inventors: Corinne Claireaux, Paris (FR); Carole Fredy, Nogent-sur-Marne (FR); Octavio Cintora-Gonzalez, Taverny (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 698 days.

(21) Appl. No.: 16/062,467

(22) PCT Filed: Dec. 16, 2016

(86) PCT No.: PCT/FR2016/053514
§ 371 (c)(1),
(2) Date: Jun. 14, 2018

(87) PCT Pub. No.: WO2017/103528
PCT Pub. Date: Jun. 22, 2017

(65) Prior Publication Data
US 2018/0362390 A1    Dec. 20, 2018

(30) Foreign Application Priority Data

Dec. 17, 2015 (FR) .................................... 1562678

(51) Int. Cl.
| | | |
|---|---|---|
| *C03C 3/087* | (2006.01) | |
| *C03C 3/085* | (2006.01) | |
| *C03C 4/18* | (2006.01) | |
| *C03C 4/02* | (2006.01) | |
| *C03C 21/00* | (2006.01) | |
| *B32B 17/10* | (2006.01) | |
| *C03C 8/02* | (2006.01) | |

(52) U.S. Cl.
CPC .......... *C03C 3/087* (2013.01); *B32B 17/1011* (2013.01); *B32B 17/10036* (2013.01); *B32B 17/10119* (2013.01); *B32B 17/10137* (2013.01); *B32B 17/10743* (2013.01); *B32B 17/10761* (2013.01); *B32B 17/10788* (2013.01); *C03C 3/085* (2013.01); *C03C 4/02* (2013.01); *C03C 4/18* (2013.01); *C03C 8/02* (2013.01); *C03C 21/002* (2013.01); *B32B 2307/4026* (2013.01); *C03C 2204/00* (2013.01); *C03C 2207/00* (2013.01)

(58) Field of Classification Search
CPC ........... C03C 3/087; C03C 3/085; C03C 4/18; C03C 4/02; C03C 8/02; C03C 21/002; B32B 17/10119

USPC ......................................................... 428/213
See application file for complete search history.

(56) References Cited

U.S. PATENT DOCUMENTS

| | | | | |
|---|---|---|---|---|
| 5,837,629 | A | * | 11/1998 | Combes .................. C03C 3/095 501/70 |
| 2008/0188367 | A1 | * | 8/2008 | Gou ........................ C03C 3/078 501/67 |
| 2014/0017499 | A1 | * | 1/2014 | Yamamoto .............. C03C 3/085 428/410 |
| 2015/0166403 | A1 | | 6/2015 | Yamamoto |
| 2016/0257094 | A1 | * | 9/2016 | Lestringant ....... B32B 17/10889 |
| 2016/0263969 | A1 | * | 9/2016 | Lestringant ....... B32B 17/10761 |

FOREIGN PATENT DOCUMENTS

| | | | |
|---|---|---|---|
| EP | 0 452 207 A1 | 10/1991 | |
| EP | 1 732 854 B1 | 12/2009 | |
| EP | 1 487 752 B1 | 12/2012 | |
| WO | WO 2014/120641 A2 | 8/2014 | |
| WO | WO 2015/058885 A1 | 4/2015 | |
| WO | WO 2015/059406 A1 | 4/2015 | |
| WO | WO 2015/059407 A1 | 4/2015 | |
| WO | WO-2015059406 A1 * | 4/2015 | ....... B32B 17/10036 |
| WO | WO-2015059407 A1 * | 4/2015 | ....... B32B 17/10119 |
| WO | WO-2015092385 A1 * | 6/2015 | ....... B32B 17/10761 |

OTHER PUBLICATIONS

International Search Report as issued in International Patent Application No. PCT/FR2016/053514, dated Mar. 15, 2017.

* cited by examiner

*Primary Examiner* — Tahseen Khan
(74) *Attorney, Agent, or Firm* — Pillsbury Winthrop Shaw Pittman LLP

(57) ABSTRACT

A colored glass sheet of aluminosilicate composition chemically strengthened by ion exchange, includes the following oxides in the weight content ranges defined below: $SiO_2$ between 59.20 and 68.00%; $Al_2O_3$ between 2.00 and 8.00%; MgO between 6.00 and 9.00% when the $Al_2O_3$ content is between 5.00 and 8.00% and when the $SiO_2/Al_2O_3$ ratio is greater than or equal to 7.8 or between 8.00 and 10.00% when the $Al_2O_3$ content is between 2.00 and 5.00% and when the $SiO_2/Al_2O_3$ ratio is greater than or equal to 24; $Na_2O$ between 9.00 and 16.00%; $K_2O$ between 5.00 and 11.00%; $B_2O_3$ between 0 and 3.00%; CaO between 0 and 1.00%; and the following coloring agents in the weight content ranges defined below: $Fe_2O_3$ total between 0.05 and 6.00%; CoO between 0 and 2.00%; NiO between 0 and 1.00%; Se between 0 and 0.10%, and the glass having a redox factor of between 0.10 and 0.65.

21 Claims, No Drawings

CHEMICALLY STRENGTHENED COLORED THIN GLASS

CROSS-REFERENCE TO RELATED APPLICATIONS

This application is the U.S. National Stage of PCT/FR2016/053514, filed Dec. 16, 2016, which in turn claims priority to French patent application number 1562678 filed Dec. 17, 2015. The content of these applications are incorporated herein by reference in their entireties.

The present invention relates to a chemically strengthened colored thin glass. This colored thin glass may be one of the glass sheets of laminated glazing and may thus be used, for example, for applications in the motor vehicle industry.

Colored glazings are commonly used in the fields of transportation and construction and are obtained by introducing into the chemical composition of the glasses coloring agents, for instance iron oxides, cobalt oxides and/or nickel oxides, which make it possible to modify the light transmittance and the energy transmittance of the glass. Thus, for roofing glazings or rear window glazings, constructors seek to reduce the light transmittance for the comfort of the passengers and the driver.

One of the current trends, in particular in the motor vehicle sector in which it is sought to reduce the weight of vehicles, consists in reducing the thicknesses of the glass sheets constituting the motor vehicle glazings. Manufacturing laminated glazing with two sheets of thin glass still remains difficult at the present time, since the final product does not have the rigidity required for motor vehicle applications. One of the solutions adopted consists in using laminated glazings in which only one of the constituent glass sheets of the laminated glazing is a thin glass sheet. This type of glazing is consequently asymmetric. It is necessary for even weight-reduced asymmetric laminated glazings to have a mechanical strength that is compatible with the desired applications and for it to remain possible to manufacture them via usual forming and fashioning processes. One of the possibilities for strengthening the mechanical strength of the glazing consists in using at least one glass sheet which has a surface zone in compression and a central zone in tension. This type of glass sheet is in particular obtained by making it undergo a thermal or chemical tempering process. Chemical tempering is a process which consists in performing an ion exchange within the glass sheet: the surface substitution of an ion (generally an alkaline ion such as sodium or lithium) with an ion of larger ionic radius (generally another alkaline ion, such as potassium or sodium) from the surface of the glass down to a depth commonly referred to as the "exchange depth" makes it possible to create at the surface of the glass sheet residual compressive stresses down to a certain depth, often referred to as the "compression depth". This depth depends in particular on the duration of the ion exchange treatment, the temperature at which it is performed and also the composition of the glass sheet. It is necessary to find a compromise between the duration and the temperature of this treatment, taking into account in particular the production constraints in glazing manufacturing lines. In the case of colored glasses, it is known that certain coloring agents such as in particular ion oxide, which are commonly used in glass compositions, have a tendency to reduce the chemical strengthening since the presence of iron in the glass compositions leads to a reduction in the exchange depth. It is thus necessary to adapt the chemical compositions of the colored glasses so that they are compatible with chemical tempering processes.

Asymmetric laminated glazing comprising a chemically tempered glass sheet is thus often glazing formed from two glass sheets of different thickness and also of different chemical composition. Now, for the desired applications and in particular in the field of transportation (motor vehicles, aircraft, helicopters, etc.), it is necessary to give the glazing a certain curvature and to achieve bending of the constituent glass sheets of the glazing before they are assembled. It is advantageous to use bending techniques that make it possible to bend the glass sheets simultaneously. This in particular ensures that the sheets will have exactly the same curvatures, which will facilitate their assembly. In bending processes, the two glass sheets are placed one on the other and are supported along their marginal end parts in a substantially horizontal manner by a frame or skeleton having the desired profile, i.e. the definitive profile of the glazing after assembly. The glass sheet of lower thickness is positioned on the thicker glass sheet so that the thin sheet rests homogeneously on the thicker sheet over all the contact zones. Once thus positioned on the frame, the two glass sheets pass through a bending oven. Given that the two glass sheets have different chemical compositions, their behavior during this bending step is different and the risk of appearance of defects or residual stresses may consequently be increased.

Patent application WO2014/120641 describes colored glasses whose chemical composition has been modified to be able to be chemically tempered. However, most of the glasses described in said document are black. They have a very high content of aluminum oxide, introduced to compensate for the presence of iron which is unfavorable toward chemical tempering. This increase in alumina is not desirable since it leads to a rapid increase in the viscosity of the glass and consequently higher process costs. Moreover, the glass compositions described in said patent application do not necessarily have the desired properties allowing simultaneous bending with a soda-lime-silica glass sheet.

It is thus sought to obtain glass compositions that are both colored, with different possible colorations (green, blue or gray depending on the colorants chosen), which can be chemically tempered, even with a large content of colorants, and which can be simultaneously bent with a glass sheet of soda-lime-silica type during the process for manufacturing laminated glazings. The present invention falls within this context, one of the subjects of which relates to a chemically strengthened colored glass sheet. Another subject of the invention relates to laminated glazing comprising at least one chemically strengthened colored glass sheet. The process for manufacturing such laminated glazing is also a subject of the invention.

To this end, one subject of the invention is a colored glass sheet chemically strengthened by an ion exchange, comprising the following oxides in the weight content ranges defined below:

| | |
|---|---|
| $SiO_2$ | between 59.20 and 68.00% |
| $Al_2O_3$ | between 2.00 and 8.00% |
| MgO | between 6.00 and 9.00% if the $Al_2O_3$ content is between 5.00 and 8.00% and if the $SiO_2/Al_2O_3$ ratio is greater than or equal to 7.8, or |
| | between 8.00 and 10.00% if the $Al_2O_3$ content is between 2.00 and 5.00% and if the $SiO_2/Al_2O_3$ ratio is greater than or equal to 24, |

-continued

| | |
|---|---|
| Na$_2$O | between 9.00 and 16.00% |
| K$_2$O | between 5.00 and 11.00% |
| B$_2$O$_3$ | between 0 and 3.00% |
| CaO | between 0 and 1.00% | and the following coloring agents in the weight content ranges defined below:

| | |
|---|---|
| Fe$_2$O$_3$ total | between 0.05 and 6.00% |
| CoO | between 0 and 2.00% |
| NiO | between 0 and 1.00% |
| Se | between 0 and 0.10%, | the glass having a redox factor of between 0.10 and 0.65.

The glass sheets having this composition may have a green, blue or gray coloration, as a function of the introduced agents that they contain and of the respective amounts thereof.

According to one embodiment, the Al$_2$O$_3$ content is between 3.00 and 8.00% and, in this case, the MgO content is between 8.00 and 10.00% if the Al$_2$O$_3$ content is between 3.00 and 5.00% and if the SiO$_2$/Al$_2$O$_3$ ratio is greater than or equal to 24.

Other coloring agents chosen from vanadium, chromium, manganese, copper, silver, titanium, tin and lanthanide oxides, and/or sulfides, for instance cadmium sulfides, may be added to the composition in a weight content of less than 1.00%.

The glass sheet may also comprise other additives, for instance agents for modifying the optical properties in certain parts of the spectrum, in particular in the ultraviolet region, such as CeO$_2$, WO$_3$, La$_2$O$_3$ and V$_2$O$_5$, the total weight content of these additives not exceeding 2.00%, preferably 1.00%.

The glass sheets thus colored are in particular characterized by their light transmittance under illuminant A (TLA) within the meaning of standard ISO 11664-2 with, as observer, that of reference CIE 1931 within the meaning of standard ISO 11664-1 and by their total energy transmittance within the meaning of standard ISO 9050: 2003 for a given thickness.

The level of coloration of glasses is determined by indicating the CIE L*a*b* colorimetric coordinates, for which L* corresponds to the luminance and a* and b* are parameters which express the color difference relative to that of a gray surface of the same luminance. The illuminant used is the illuminant D65 and the observer is that of reference CIE 1964 within the meaning of standards ISO 11664-1 and -2.

The total iron content is expressed in the form of the oxide Fe$_2$O$_3$. Iron oxide may be present in ferric or ferrous form. The expression "total Fe$_2$O$_3$" should thus be understood as denoting all of the iron oxide present in the glass, i.e. in both possible forms, but expressed in the form of Fe$_2$O$_3$. The redox factor is defined as being the ratio of the weight content of ferrous oxide expressed in the form of FeO to the weight content of total iron expressed in the form of Fe$_2$O$_3$.

The presence of iron in the glass compositions gives a blue-green coloration as a function of the redox and decreases the light and energy transmittances of the glass.

Cobalt oxide participates toward the blue coloration of the glass sheet.

Nickel oxide gives the glass sheet a brown/gray coloration.

By varying the contents of colorants, a wide range of coloration is thus available, while at the same time maintaining the possibility of chemically strengthening the glass sheet, without the optical properties being greatly modified.

The content of SiO$_2$, which is the main oxide forming the glass, is between 59.20% and 68.00% by weight. This range advantageously makes it possible to have stable compositions, which have a good capacity for chemical strengthening, and viscosities that are compatible with the usual processes for manufacturing glass sheets (floating of the glass on a bath of molten metal) and with the bending processes to ensure simultaneous bending during the manufacture of laminated glazing comprising a sheet of soda-lime-silica type.

The weight content of Al$_2$O$_3$ is between 3 and 8%, which makes it possible to modify the viscosity of the glass so as to remain within viscosity ranges that allow the manufacture of glasses without increasing the forming temperatures. Alumina also has an influence on the performance qualities as regards the chemical strengthening of the glasses.

Sodium and potassium oxides make it possible to maintain the melting temperatures and the viscosity of the glasses within acceptable limits. The simultaneous presence of these two oxides in particular has the advantage of increasing the hydrolytic resistance of the glasses and the rate of interdiffusion between the sodium and potassium ions.

The weight content of magnesium oxide varies between 6 and 10%, but must be adjusted according to the weight content of Al$_2$O$_3$ and SiO$_2$. This oxide promotes the melting of the glass compositions and improves the viscosity at high temperatures, while contributing to the increase in the hydrolytic resistance of the glasses.

The weight content of calcium oxide is limited to 1.00% since this oxide is detrimental to chemical tempering.

Advantageously, the glass sheet is strengthened by an exchange of sodium ions with potassium ions. It is strengthened by exchange of surface ions over an ion exchange depth of at least 30 µm, preferentially over a depth of at least 35 µm. The exchange depth is estimated by the weight gain method. It is deduced from the gain in mass of the samples assuming that the diffusion profile is approximated by a function "erfc" taking as convention that the exchange depth corresponds to the depth for which the concentration of potassium ions is equal to that of the glass matrix to within 0.5% (as described in Rene Gy, Ion exchange for glass strengthening, Materials Science and Engineering: B, Volume 149, Issue 2, 25 March 2008, Pages 159-165). Here, the thickness of the specimen is negligible relative to the dimensions of the tested sample and the weight gain Δm can be related to the exchange depth $e_{exch}$ by the formula $$e_{exch} = \sqrt{\pi} \frac{\Delta m}{m_i} \frac{M_{tot} e_v}{\alpha_{Na2O} \cdot (M_{K2O} - M_{Na2O})}$$

with $m_i$ being the initial mass of the specimen, $M_{tot}$ the total molar mass of the glass, $M_{K2O}$ and $M_{Na2O}$ the molar masses of the oxides K$_2$O and Na$_2$O, respectively, $\alpha_{Na2O}$ the molar percentage of sodium, and $e_v$ the thickness of the specimen.

Another subject of the invention relates to laminated glazing comprising at least one glass sheet as described above.

The laminated glazing according to the invention comprises at least a first glass sheet of soda-lime-silica type, a polymeric spacer and a second glass sheet which has the composition described above and which is colored.

It is essential for the two constituent glass sheets of the glazing according to the present invention to be able to be bent simultaneously. The laminated glazing according to the invention is characterized in that the difference between the temperatures of each of the constituent glass sheets of the glazing for which the viscosity is $10^{10.3}$ poises, written as T(log η=10.3), is less, as an absolute value, than 30° C. This temperature is obtained by taking the average between the upper annealing temperature, i.e. the temperature at which the viscosity of the glass is $10^{13}$ poises, and the softening point, i.e. the temperature at which the viscosity of the glass is $10^{7.6}$ poises for each of the glass sheets. The upper annealing temperature corresponds to the temperature for which the viscosity of the glass is high enough for the stresses to be able to disappear totally within a given time (stress relaxation time of about 15 minutes). This temperature is also occasionally referred to as the "stress relaxation temperature". The measurements of this temperature are conventionally taken according to standard NF B30-105. The softening point, also occasionally referred to as the "Littleton temperature", is itself defined as being the temperature at which a glass yarn with a diameter of about 0.7 mm and a length of 23.5 cm lengthens by 1 mm/min, under its own weight (standard ISO 7884-6). This temperature may be measured or calculated as explained in the publication Fluegel A. 2007, Europ. J. Glass Sci. Technol. A 48 (1) 13-30. Preferentially, the difference between the temperature T1 (log η=10.3) of the first glass sheet and the temperature T2 (log η=10.3) of the second glass sheet is less, as an absolute value, than 23° C. This small temperature difference ensures that the two glass sheets of the glazing according to the invention can be simultaneously bent, and then assembled with the polymeric spacer, without any risk of appearance of defects such as optical defects in the glazing.

Thus, by combining a first glass sheet of soda-lime-silica type with a second glass sheet of aluminosilicate type whose chemical composition is described above, the inventors have discovered that it was possible to obtain, by simultaneous bending of the two glass sheets, glazing which has the desired mechanical strength and coloration properties.

The second glass sheet is a glass of colored aluminosilicate type, comprising the following oxides in the weight content ranges defined below:

| | |
|---|---|
| $SiO_2$ | between 59.20 and 68.00% |
| $Al_2O_3$ | between 2.00 and 8.00% |
| MgO | between 6.00 and 9.00% if the $Al_2O_3$ content is between 5.00 and 8.00% and if the $SiO_2/Al_2O_3$ ratio is greater than or equal to 7.8 or between 8.00 and 10.00% if the $Al_2O_3$ content is between 2.00 and 5.00% and if the $SiO_2/Al_2O_3$ ratio is greater than or equal to 24, |
| $Na_2O$ | between 9.00 and 16.00% |
| $K_2O$ | between 5.00 and 11.00% |
| $B_2O_3$ | between 0 and 3.00% |
| CaO | between 0 and 1.00% | and the following coloring agents in the weight content ranges defined below:

| | |
|---|---|
| $Fe_2O_3$ total | between 0.05 and 6.00% |
| CoO | between 0 and 2.00% |
| NiO | between 0 and 1.00% |
| Se | between 0 and 0.10%, | the glass having a redox factor of between 0.10 and 0.65.

It has a temperature $T_2$ (log η=10.3) close to the temperature $T_1$ (log η=10.3) of the first glass sheet, which makes it possible to bend the two sheets simultaneously more easily.

According to one embodiment, the $Al_2O_3$ content is between 3.00 and 8.00% and, in this case, the MgO content is between 8.00 and 10.00% if the $Al_2O_3$ content is between 3.00 and 5.00% and if the $SiO_2/Al_2O_3$ ratio is greater than or equal to 24.

The first glass sheet is of soda-lime-silica type and comprises the following oxides in the weight content ranges defined below:

| | |
|---|---|
| $SiO_2$ | between 65.00 and 75.00% |
| $Na_2O$ | between 10.00 and 20.00% |
| CaO | between 2.00 and 15.00% |
| $Al_2O_3$ | between 0 and 5.00% |
| MgO | between 0 and 5.00% |
| $K_2O$ | between 0 and 5.00%. |

The compositions of the first and second glass sheets mentioned above indicate only the essential constituents. They do not give the minor elements of the composition, such as the refining agents conventionally used such as arsenic, antimony, tin and cerium oxides, halogens or metal sulfides.

The constituent glass sheets of the laminated glazing according to the present invention have different thicknesses and the first glass sheet is the thicker sheet. The first glass sheet has a thickness of not more than 2.1 mm, preferably not more than 1.6 mm. The second glass sheet, which is thinner than the first, has a thickness of not more than 1.5 mm. Preferentially, this sheet has a thickness of not more than 1.1 mm, or even is less than 1 mm. Advantageously, the second glass sheet has a thickness of less than or equal to 0.7 mm. The thickness of the sheet is at least 50 μm. Using thin glass sheets makes it possible to lighten the laminated glazing and consequently satisfies the specifications currently required by constructors seeking to reduce the weight of vehicles.

The polymeric spacer placed between the two glass sheets is formed from one or more layers of thermoplastic material. It may in particular be made of polyurethane, polycarbonate, polyvinyl butyral (PVB), polymethyl methacrylate (PMMA), ethylene-vinyl acetate (EVA) or ionomer resin. The polymeric spacer may be in the form of a multilayer film having particular functionalities, for instance better acoustic, anti-UV, anti-IR, etc. properties. Conventionally, the polymeric spacer comprises at least one layer of PVB. The thickness of the polymeric spacer is between 50 μm and 4 mm. Generally, its thickness is less than 1 mm. In motor vehicle glazings, the thickness of the polymeric spacer is conventionally 0.76 mm. When the constituent glass sheets of the glazing are very thin, it may be advantageous to use a polymeric sheet with a thickness of greater than 1 mm, or even greater than 2 or 3 mm to give the laminated glazing rigidity, without excessively increasing the weight.

The subject of the invention is also a process for obtaining the laminated glazing according to the present invention, comprising a step of simultaneous bending of the first and second glass sheet, a step of ion exchange of the second glass sheet and a step of assembling the two glass sheets with the polymeric spacer.

The constituent glass sheets of the glazing according to the present invention may be manufactured according to various known processes, such as the float process in which the molten glass is poured onto a bath of molten tin, and the process of lamination between two rollers (or "fusion draw" process), in which the molten glass overflows from a channel and forms a sheet by gravity, or the "down-draw" process, in which the molten glass flows downward through a slit, before being drawn to the desired thickness and simultaneously cooled.

The step of bending of the first and second glass sheets is performed simultaneously. The two glass sheets are positioned one above the other in a bending frame or skeleton, the thinner glass sheet being the one on top, which is the one further away from the skeleton. The assembly is thus introduced into a bending oven. The two sheets are separated by a pulverulent agent such as talc, calcite or ceramic powder to prevent friction and bonding of one sheet to the other. The bending thus performed is a forming operation by gravity and/or by pressing.

The ion exchange to which the second glass sheet is subjected is generally performed by placing said sheet in a bath filled with a molten salt of the desired alkaline ion, for example in a bath of potassium nitrate. This exchange takes place at a temperature below the glass transition temperature and at the degradation temperature of the bath, advantageously at a temperature below 490° C. The duration of the ion exchange is less than 24 hours. However, it is desirable for it to be shorter in order for it to be compatible with the productivities of the processes for manufacturing motor vehicle laminated glazings. The treatment time is advantageously less than or equal to 4 hours, preferentially less than or equal to 2 hours. The exchange temperatures and times are to be adjusted as a function of the composition of the glass, of the thickness of the glass sheet and of the desired level of stresses. The ion exchange may advantageously be followed by a heat treatment step to reduce the tension stress at the core and to increase the compressive depth.

The assembly step then consists in assembling the two glass sheets with the thermoplastic spacer by pressurizing in an autoclave and raising the temperature.

The laminated glazing according to the present invention advantageously constitutes a motor vehicle glazing. The first sheet of soda-lime-silica type and the thinner second sheet of aluminosilicate type are bent together before being assembled with the polymeric spacer to form the glazing according to the present invention. The second sheet is the one which is on top in the bending frame. Once mounted in the vehicle, this second glass sheet advantageously corresponds to the inner glass sheet, i.e. the one placed toward the interior of the passenger compartment. The first glass sheet is thus the one that is placed toward the exterior. The glass sheets may thus be assembled directly after the bending step, without the need to invert the order of the glass sheets.

It is also possible, if the colored thin glass sheet must be located to the exterior of the passenger compartment, to invert the two glass sheets after the bending step.

The examples below illustrate the invention without limiting its scope.

Glazings according to the invention were prepared from various glass sheets of different composition.

Various compositions for the second glass sheet were prepared and are given in the tables below:

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| $SiO_2$ | 62.37 | 61.35 | 62.34 | 61.57 | 61.69 | 59.41 | 63.34 | 64.25 | 60.23 |
| $Al_2O_3$ | 7.89 | 7.80 | 7.93 | 7.86 | 7.84 | 7.57 | 2.58 | 2.56 | 7.59 |
| MgO | 8.43 | 8.35 | 8.41 | 8.38 | 8.85 | 6.44 | 9.26 | 8.06 | 8.17 |
| $Na_2O$ | 11.75 | 11.75 | 11.85 | 11.55 | 11.75 | 11.10 | 9.34 | 9.38 | 11.53 |
| $K_2O$ | 9.51 | 9.68 | 9.21 | 9.27 | 9.71 | 9.12 | 8.40 | 8.64 | 9.35 |
| $Fe_2O_3$ total | 0.05 | 1.07 | 0.05 | 0.06 | 0.05 | 5.04 | 5.62 | 5.66 | 1.62 |
| CoO | — | — | 0.21 | 1.31 | 0.11 | 0.55 | 0.60 | 0.60 | 1.51 |
| NiO | — | — | — | — | — | 0.77 | 0.86 | 0.85 | — |
| redox | 0.5 | 0.17 | 0.46 | n.d. | 0.306 | 0.14 | 0.13 | 0.13 | 0.10 |
| total | 100.00 | 100.00 | 100.00 | 100.00 | 100.00 | 100.00 | 100.00 | 100.00 | 100.00 |

| | Ex 10 | Ex 11 | Ex 12 | Ex 13 | Ex 14 |
|---|---|---|---|---|---|
| $SiO_2$ | 58.79 | 59.90 | 56.41 | 58.20 | 60.11 |
| $Al_2O_3$ | 7.51 | 8.57 | 11.54 | 7.96 | 7.10 |
| MgO | 7.97 | 8.12 | 7.20 | 7.70 | 8.77 |
| $Na_2O$ | 11.14 | 11.12 | 10.13 | 10.74 | 8.71 |
| $K_2O$ | 9.20 | 9.55 | 8.27 | 8.72 | 7.93 |
| $Fe_2O_3$ total | 5.39 | 2.74 | 4.97 | 5.03 | 5.94 |
| CoO | — | — | 0.71 | 0.90 | 0.60 |
| NiO | — | — | 0.77 | 0.75 | 0.84 |
| redox | 0.16 | 0.12 | 0.18 | 0.18 | 0.15 |
| total | 100.00 | 100.00 | 100.00 | 100.00 | 100.00 | n.d.: not determined

The optical characteristics and the light transmittance of the samples are measured for a glass sheet thickness of 0.7 mm. The overall light transmittance factor is measured under illuminant A TLa between 380 and 780 nm. The overall energy transmittance factor TE integrated between 295 and 2500 nm according to standard ISO 9050 (Parry Moon mass of air 1.5) is also indicated for certain examples.

Table 2 below presents the results obtained:

TABLE 2

| | Ex. 1 | Ex. 2 | Ex. 3 | Ex. 4 | Ex. 5 | Ex. 6 | Ex. 7 |
|---|---|---|---|---|---|---|---|
| TLa (0.7 mm) | 90 | 88 | 25 | 0.8 | 45 | 0.8 | 0.8 |
| TE (0.7 mm) | n.d. | n.d. | n.d. | n.d. | n.d. | 14.6 | 12.7 |
| L* | 14 | 95 | 60 | 15 | 75 | 8.5 | 7.6 |
| a* | −8 | −1.9 | 12 | 101 | 1.5 | 3.9 | −3.6 |
| b* | 1.5 | 1.2 | −50 | −98 | −30 | −17.5 | −6.5 |

TABLE 2-continued

|  | Ex. 8 | Ex. 9 | Ex 10 | Ex 11 | Ex 12 | Ex 13 | Ex 14 |
|---|---|---|---|---|---|---|---|
| TLa (0.7 mm) | 0.9 | 0.13 | 50 | 80 | 1.66 | 0.9 | 1.1 |
| TE (0.7 mm) | 14.4 | 30.8 | n.d. | n.d. | 13.5 | 10.9 | 12.8 |
| L* | 9 | 0 | 75 | 92 | 14 | 9 | 10.6 |
| a* | 1.6 | 58.8 | −7.4 | −4.3 | −7.8 | −2.8 | −7.6 |
| b* | −14.6 | −55.1 | 30 | 7.6 | 1.2 | −8.4 | 0.8 | n.d.: not determined

The optical characterizations show that the glass sheets may have very different transmittance levels and also very varied colorations, as a function of the weight contents of coloring agents. Examples 1, 2, 10 and 11 are green glasses. Examples 3, 4 and 5 are blue glasses and examples 6 to 9 and 12 to 14 are black glasses.

Table 3 gives the values of the upper annealing temperatures T(log η=13) obtained by dilatometry, the Littleton temperatures, the temperatures for which the viscosity of the glass is 10.3 poises T(log η=7.6), and also the exchange depth after an ion exchange lasting 4 hours at a temperature of 440° C. for each of the compositions given in the above table (thickness of the samples tested 0.72 mm).

TABLE 3

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| T(log η = 13) in ° C. | 557 | 548 | 553 | 553 | 554 | 538 | 550 | 541 |
| T(log η = 7.6) in ° C. | 724 | 732 | 740 | 737 | 740 | 715 | 724 | 716 |
| T(log η = 10.3) in ° C. | 641 | 640 | 647 | 649 | 647 | 627 | 637 | 629 |
| Exchange depth (μm) | 58 | 37 | 45 | 35.1 | 35.9 | 30.4 | 35.5 | 37.7 |

|  | Ex 9 | Ex 10 | Ex 11 | Ex 12 | Ex 13 | Ex 14 |
|---|---|---|---|---|---|---|
| T(log η = 13) in ° C. | 552 | 545 | 573 | 578 | 551 | 578 |
| T(log η = 7.6) in ° C. | 734 | 717 | 737 | 757 | 728 | 754 |
| T(log η = 10.3) in ° C. | 643 | 631 | 655 | 667.5 | 639.5 | 666 |
| Exchange depth (μm) | 34.1 | 23.2 | 29.1 | 20.9 | 25.8 | 25.1 |

Examples 10 to 14 are examples not in accordance with the invention: the exchange depths are less than 30 μm for all these samples.

Glazings according to the present invention are manufactured using a first glass sheet having the following composition:

| SiO₂ | 71.50% |
|---|---|
| Na₂O | 14.10% |
| CaO | 8.75% |
| Al₂O₃ | 0.80% |
| MgO | 4.00% |
| K₂O | 0.25% |
| Various | 0.6% |

The characteristic temperatures of this composition are, respectively, 545° C. and 725° C. for T(log η=13) and T(log η=7.6). The temperature T(log η=10.3) is thus 635° C.

The asymmetric laminated glazings are manufactured using a first glass sheet of the soda-lime-silica composition given above, with a thickness of 1.6 mm, a PVB spacer 0.76 mm thick and a second glass sheet 0.7 mm thick, the composition of which is given in table 1.

All the compositions of the above examples, with the exception of examples 12 and 14, have a temperature difference between the temperature T1(log η=10.3) of the first glass sheet of soda-lime-silica type and the temperature T2(log η=10.3) of the second glass sheet of aluminosilicate type for the glass sheets which is less, as an absolute value, than 30° C., which makes the two glass sheets simultaneously bendable.

Only the glasses prepared with a second glass sheet in accordance with the invention (ex. 1 to 9) make it possible to obtain laminated glazings that satisfy simultaneously the criteria of mechanical strength, coloration and the possibility of simultaneous bending.

The invention claimed is:

1. A laminated glazing, comprising an outer first glass sheet of soda-lime-silica type, a polymeric spacer and an inner second glass sheet that is colored and chemically strengthened and comprising the following oxides in the weight content ranges defined below:

| SiO₂ | between 59.20 and 68.00% |
|---|---|
| Al₂O₃ | between 2.00 and 8.00% |
| MgO | between 6.00 and 9.00% when the Al₂O₃ content is between 5.00 and 8.00% and when the SiO₂/Al₂O₃ ratio is greater than or equal to 7.8 or between 8.00 and 10.00% when the Al₂O₃ content is between 2.00 and 5.00% and when the SiO₂/Al₂O₃ ratio is greater than or equal to 24, |
| Na₂O | between 9.00 and 16.00% |
| K₂O | between 6.00 and 11.00% |
| B₂O₃ | between 0 and 3.00% |
| CaO | between 0 and 1.00% | and the following coloring agents in the weight content ranges defined below:

| Fe₂O₃ total | between 0.05 and 6.00% |
|---|---|
| CoO | between 0 and 2.00% |
| NiO | between 0 and 1.00% |
| Se | between 0 and 0.10%, | the glass having a redox factor of between 0.10 and 0.65,
wherein the laminated glazing is a bent laminated glazing, and
wherein the inner second glass sheet has a thickness that is lower than the outer first glass sheet.

2. The laminated glazing as claimed in claim 1, comprising the following oxides in the weight content ranges defined below:

| SiO₂ | between 59.20 and 68.00% |
|---|---|
| Al₂O₃ | between 3.00 and 8.00% |
| MgO | between 6.00 and 9.00% when the Al₂O₃ content is between 5.00 and 8.00% and when the SiO₂/Al₂O₃ ratio is greater than or equal to 7.8 or between 8.00 and 10.00% when the Al₂O₃ content is between 3.00 and 5.00% and when the SiO₂/Al2O₃ ratio is greater than or equal to 24, |
| Na₂O | between 9.00 and 16.00% |
| K₂O | between 6.00 and 11.00% |
| B₂O₃ | between 0 and 3.00% |
| CaO | between 0 and 1.00% | and the following coloring agents in the weight content ranges defined below:

| | |
|---|---|
| Fe$_2$O$_3$ total | between 0.05 and 6.00% |
| CoO | between 0 and 2.00% |
| NiO | between 0 and 1.00% |
| Se | between 0 and 0.10%, | the glass having a redox factor of between 0.10 and 0.65.

3. The laminated glazing as claimed in claim 1, wherein the first glass sheet is a glass of soda-lime-silica type comprising the following oxides in the weight content ranges defined below:

| | |
|---|---|
| SiO$_2$ | between 65.00 and 75.00% |
| Na$_2$O | between 10.00 and 20.00% |
| CaO | between 2.00 and 15.00% |
| Al$_2$O$_3$ | between 0 and 5.00% |
| MgO | between 0 and 5.00% |
| K$_2$O | between 0 and 5.00%. |

4. The laminated glazing as claimed in claim 1, wherein a difference between the temperatures T(log η=10.3) of each of the glass sheets for which the viscosity is $10^{10.3}$ poises is less, as an absolute value, than 30° C.

5. The laminated glazing as claimed in claim 1, wherein the first glass sheet has a thickness of not more than 2.1 mm.

6. The laminated glazing as claimed in claim 1, wherein the second glass sheet, which is thinner than the first glass sheet, has a thickness of not more than 1.5 mm.

7. The laminated glazing as claimed in claim 1, wherein the polymeric spacer placed between the two glass sheets is formed from one or more layers of thermoplastic material.

8. The laminated glazing as claimed in claim 7, wherein the thickness of the polymeric spacer is between 50 μm and 4 mm.

9. A process for manufacturing the laminated glazing as claimed in claim 1, comprising a step of simultaneous bending of the first and the second glass sheet, a step of ion exchange of the second glass sheet and a step of assembling the first and second glass sheets with the polymeric spacer.

10. The process as claimed in claim 9, wherein the ion exchange step takes place at a temperature below 490° C., for a time of less than 24 hours.

11. The process as claimed in claim 9, wherein, during the bending step, the second glass sheet, which is thinner than the first glass sheet, is positioned above the first glass sheet.

12. A motor vehicle glazing obtained via the process as claimed in claim 9, wherein the second glass sheet is placed toward the interior of the passenger compartment.

13. The laminated glazing as claimed in claim 1, wherein the inner second glass sheet is strengthened by chemical tempering with an ion exchange depth of at least 35 μm.

14. The laminated glazing as claimed in claim 4, wherein the difference between the temperatures T(log η=10.3) of each of the glass sheets for which the viscosity is $10^{10.3}$ poises is less, as an absolute value, than 23° C.

15. The laminated glazing as claimed in claim 5, wherein the first glass sheet has a thickness of not more than 1.6 mm.

16. The laminated glazing as claimed in claim 6, wherein the second glass sheet, which is thinner than the first glass sheet, has a thickness of not more than 1.1 mm.

17. The laminated glazing as claimed in claim 16, wherein the second glass sheet, which is thinner than the first glass sheet, has a thickness of not more than 1 mm.

18. The laminated glazing as claimed in claim 7, wherein the thermoplastic material is made of polyurethane, polycarbonate, polyvinyl butyral (PVB), polymethyl methacrylate (PMMA), ethylene-vinyl acetate (EVA) or ionomer resin.

19. The process as claimed in claim 10, wherein the time is less than or equal to 4 hours.

20. The process as claimed in claim 19, wherein the time is less than or equal to 2 hours.

21. The laminated glazing as claimed in claim 1, wherein the outer first glass sheet of soda-lime-silica type is not chemically strengthened.

\* \* \* \* \*